Figure 1:
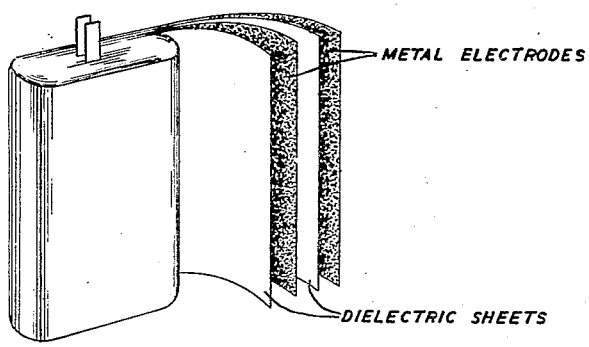

Aug. 27, 1940.     G. T. KOHMAN     2,212,836
CONDENSER DIELECTRIC
Filed Aug. 31, 1938

INVENTOR
G. T. KOHMAN
BY
ATTORNEY

Patented Aug. 27, 1940

2,212,836

UNITED STATES PATENT OFFICE 2,212,836

CONDENSER DIELECTRIC

Girard T. Kohman, Summit, N. J., assignor to Bell Telephone Laboratories Incorporated, New York, N. Y., a corporation of New York Application August 31, 1938, Serial No. 227,663

13 Claims. (Cl. 154—2.6)

The present invention relates to condenser dielectrics and to electrical condensers containing these dielectrics. More particularly, it relates to condenser dielectrics containing halogenated dielectric materials, the dielectrics being of such constitution as to resist the chemical action of the halogenated materials.

Certain halogenated substances, or more particularly certain halogenated carbon compounds such as the halogenated cyclic hydrocarbons, which possess a high dielectric constant, high resistance, a low dielectric loss and high chemical stability are very desirable as condenser dielectrics. Chlorinated substances such as the chlorinated hydrocarbons, chlorinated diphenyl and chlorinated naphthalene, are the most commonly used for this purpose. Ordinarily they are employed by impregnating them in porous spacers, such as paper, textiles or other cellulosic materials.

It is an object of the present invention to prolong the life of this type of condenser by delaying the ultimate failure of the dielectric, particularly when the condenser is operated under direct current potentials and at elevated temperatures. Inspection of an impregnated linen paper or similar paper dielectric of this type after failure often shows it to be spotted with carbonized and decomposed areas. It is believed that the failure of the dielectric is due to the fact that the halogenated impregnants, such as chlorinated naphthalene and chlorinated diphenyl, although they are ordinarily considered stable, tend to decompose slightly, particularly under the influence of an electrical field, to form traces of halogen compounds, chiefly hydrohalogen acids such as hydrochloric acid. This decomposition process is autocatalytic in that the traces of hydrohalogen acid tend to react with the electrode materials to form substances which tend to accelerate the further decomposition of the halogenated compounds. The presence of this hydrohalogen acid, which acts as an electrolyte, decreases the resistance of the dielectric in the areas in which it is concentrated, and in the case of an impregnated paper dielectric the combined electrical and chemical action causes destruction of the paper spacer.

The presence of free acid is also objectionable because it causes corrosion of the metal electrodes. When aluminum electrodes are employed, as is often preferable, reactions involving traces of hydrohalogen acid are particularly objectionable due to the action of the hydrochloric or other hydrohalogen acid on the electrodes with consequent formation of aluminum chloride or other aluminum halide. Aluminum chloride, for example, is known to be a catalyst for the destruction of halogenated organic compounds. Thus, the catalytic action of the aluminum chloride causes the more rapid breakdown of the halogenated material into additional hydrochloric acid, thereby accelerating the destruction of the dielectric. Both the aluminum chloride and hydrochloric acid tend to cause breakdown of the cellulose in the paper spacer and consequent failure of the dielectric.

An object of the present invention is a paper spacer for use as a condenser dielectric which is resistant to the action of the halogenated dielectric materials with which it is associated.

It has been found that certain cellulosic fibres possess a much greater resistance to the action of halogenated dielectric materials than do the linen fibres or cotton fibres commonly used for preparing paper for condenser dielectrics. Thus, paper made from wood fibres, as by the soda, sulphite or sulphate processes, has a much longer life when impregnated with a halogenated dielectric material and employed in a condenser than does linen paper similarly treated. Kraft paper, which is made by the sulphate process, is a desirable form of wood paper.

Not only are the wood fibres themselves extremely resistant to destruction by the halogenated impregnants, but they also exert a protective action on other cellulosic fibres with which they are associated. Thus, paper made from a pulp of linen to which wood pulp has been added has a chemical resistance greater than that of simple linen or rag paper. Further, a sheet of kraft paper or other wood paper placed adjacent to a sheet of linen paper or rag paper in a condenser exerts a protective action on the linen or rag paper.

Figure 2:
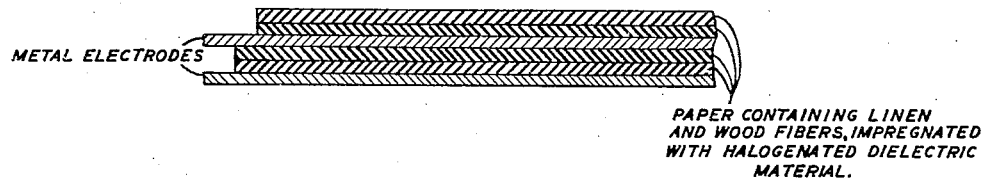
Figure 3:
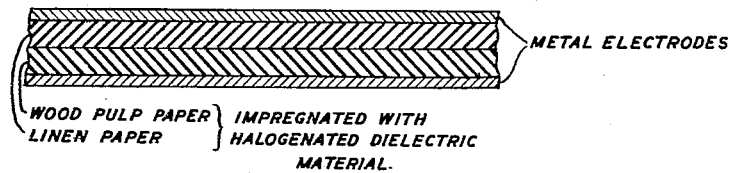

The manner in which these materials may be employed in a condenser will be more fully understood by reference to the accompanying drawing in which:

Fig. 1 represents a roll-type condenser made up of two metal electrodes separated by dielectric sheets;

Fig. 2 represents a sectional view of the electrodes having therebetween sheets of paper containing both linen and wood fibres and impregnated with a halogenated dielectric material; and Fig. 3 represents a sectional view of the electrodes in an alternative form of condenser in which the electrodes are separated by two separate sheets, one composed of linen paper, the other composed of wood pulp paper, both being impregnated with a halogenated dielectric material.

Although wood pulp paper, such as kraft paper, is desirable as a dielectric from the standpoint of its chemical resistance to destruction, it does not possess as high an initial dielectric breakdown strength or as low a power factor as linen or rag paper. Therefore, the dielectric containing sheets made up of mixed linen and wood fibres or containing two sheets, one of linen and the other of kraft paper, are, in general, more desirable than a paper containing wood fibres alone. The composite dielectrics possess the high initial strength and low power factor imparted by the linen fibres and the chemical resistance imparted by the wood fibres. Two single sheets containing both linen and wood fibres are usually preferable to two sheets, one linen and the other kraft.

Although the invention is not to be limited to any explanation of the mode of operation, it is believed that the resistance of wood pulp paper to destruction by the action of halogenated impregnants is due to the fact that one of the constituents of the fibres contains combined therewith a metal capable of replacing the hydrogen in the hydrohalogen acid generated by the halogenated impregnant. The constituent with which the metallic element is combined consists of what is commonly designated as beta and gamma cellulose. In any event, it has been found that the presence of a large amount of beta and gamma cellulose in the fibres of the dielectric increases the life of the condenser, particularly under direct current potentials.

Wood fibres are known to be rich in beta and gamma cellulose containing, for instance, about 10 to 20 per cent of these substances. In the process of pulping for paper manufacture the wood fibres are exposed to the action of alkali and alkaline earth metal salts, particularly the salts of calcium and magnesium. These salts are believed to react with the beta and gamma cellulose in such manner as to replace some of the hydrogen atoms thereof with metallic atoms, such as calcium and magnesium. When the wood pulp paper is used as a dielectric, together with a halogenated impregnant, the hydrogen of the generated hydrohalogen acid acts on the metallic compounds in the beta and gamma cellulose to replace the metallic atoms with hydrogen, thus generating the original cellulosic material and freeing metal atoms, which combine with the halide ions of the hydrohalogen acid.

This mechanism explains the superior chemical resistance of wood fibres as compared to linen fibres or cotton fibres, which are known to have a low content of beta and gamma cellulose. This mechanism also explains the protective action of the wood fibres, since if the generated hydrochloric acid is absorbed by the wood fibres, it is no longer present in the dielectric to do harm to the other constituents or to attack the electrodes.

As has been stated above, linen and cotton fibres have superior electrical properties to wood fibres or similar fibres, although they do not have as long a life when impregnated with halogenated dielectrics. Linen and cotton fibres consist almost entirely of alpha cellulose, containing about 98 or 99 per cent of this substance. Their content of beta and gamma cellulose is therefore relatively low and rarely exceeds 1 or 2 per cent.

Although the use of paper containing wood fibres has been described above, a similar resistant and protective action can be secured by incorporating in paper or forming paper from other materials having a beta and gamma cellulose content comparable to that of wood paper. Examples of such materials are straw or grass fibres, jute, manila hemp, true hemp and caroa. Papers prepared from these materials exhibit long dielectric life when impregnated with halogenated dielectric materials and exert a protective action on high alpha cellulose papers such as linen and cotton papers.

Similarly mixed papers prepared from the mixed pulps of these materials and linen or cotton have a longer life than simple linen and cotton papers and a higher initial dielectric breakdown strength and lower power factor than papers composed entirely of these materials. In general, such mixed papers preferably contain from about 25 to about 50 per cent of the high beta and gamma cellulose material, the remainder being the higher alpha cellulose material. The preferred proportion is about 30 to 40 per cent high beta and gamma cellulose material, or specifically 35 per cent. These proportions apply when wood fibres are used, as well as when the above-mentioned fibres are used.

The ways in which the invention may be embodied in a specific form of condenser are illustrated in the drawing. Fig. 1 shows a conventional rolled condenser made up of two metal electrodes separated by dielectric sheets, such as paper impregnated with a halogenated dielectric. Such a condenser may be prepared by placing the desired number of the sheets of paper described above between two metal electrodes and rolling the pile into the form shown in Fig. 1. The roll may then be dipped into a bath of chlorinated naphthalene or chlorinated diphenyl maintained at a temperature at which the impregnant is in a liquid state. After the paper is thoroughly impregnated, the roll may be removed from the bath and inserted in a protective case or otherwise prepared for use.

Fig. 2 illustrates one specific example of the invention in which the dielectric inserted between the metal electrodes consists of several sheets of paper made from a pulp of mixed wood and linen fibres. A condenser of this type may be prepared by mixing a linen pulp and a kraft pulp in such proportions that the wood fibres will make up about 35 per cent of the finished paper. The pulp is then formed into a sheet, dried and calendered according to the usual procedure for forming paper. These sheets are then interleaved with aluminum foil and rolled into a condenser as described above. The roll is then dipped in a bath of molten chlorinated naphthalene until the paper is thoroughly impregnated.

Condensers may be formed similarly with paper prepared from a cotton and manila pulp and containing about 25 per cent of manila. Similar results are obtained with cotton and kraft paper, linen and manila paper, cotton and jute paper, linen and jute paper, cotton and straw paper, linen and straw paper, cotton and hemp paper, linen and hemp paper, cotton and caroa paper and linen and caroa paper, the latter constituent in each case comprising about 35 per cent of the paper. Chlorinated diphenyl may be substituted for chlorinated naphthalene in each case.

Another specific embodiment of the invention is illustrated in Fig. 3, which shows a section of one turn of a rolled condenser in which the dielectric between the metal electrodes is made up of a sheet of linen paper and a sheet of kraft paper. This type of condenser is prepared by placing adjacent sheets of linen and kraft papers between sheets of aluminum or tin foil and rolling into a condenser. The roll is then dipped into a bath of molten chlorinated naphthalene until the paper is thoroughly impregnated. Two or more sheets of paper may be used, as desired, the linen and kraft papers being alternated in each case.

Similar satisfactory results are obtained when alternate sheets of cotton paper and kraft paper, linen paper and manila paper, cotton paper and manila paper, or linen paper and other high beta and gamma cellulose paper or cotton paper and other high beta and gamma cellulose paper are used in the above procedure. Chlorinated diphenyl may be substituted for chlorinated naphthalene in each case.

Although the invention has been described in its more specific aspects, it is to be understood that it is of broad application and is not limited to any theory of operation, the scope of the invention being limited only by the scope of the appended claims.

What is claimed is:

1. A dielectric comprising a dielectric material which tends to break down into a free acid, a spacer material which has high initial breakdown strength and low power factor, and an additional substance of cellulosic origin which is capable of reacting with the free acid formed to produce substantially inert substances.

2. A dielectric comprising a dielectric material which tends to break down into a halogen acid, a spacer material which has high initial breakdown strength and low power factor, and an additional substance of cellulosic origin which is capable of reacting with the halogen acid to produce substantially inert substances.

3. A dielectric comprising a sheet containing fibres of a cellulosic material containing a large proportion of beta and gamma cellulose and also fibres having a higher initial breakdown strength and a lower power factor, said sheet being impregnated with a halogenated cyclic hydrocarbon.

4. A dielectric comprising a sheet containing wood pulp fibres and fibres of a cellulosic material having a higher initial breakdown strength and a lower power factor, said sheet being impregnated with a halogenated dielectric material.

5. A dielectric comprising a sheet containing wood pulp fibres and linen fibres, said sheet being impregnated with a halogenated dielectric material.

6. A dielectric comprising a sheet containing wood pulp fibres and linen fibres, said sheet being impregnated with a chlorinated hydrocarbon.

7. A dielectric comprising a sheet containing wood pulp fibres and linen fibres, said sheet being impregnated with a chlorinated naphthalene.

8. A dielectric comprising a sheet containing wood pulp fibres and linen fibres, said sheet being impregnated with chlorinated diphenyl.

9. An electric condenser containing a dielectric comprising at least one sheet of a paper made of fibres of cellulose having a high content of beta and gamma cellulose and adjacent thereto at least one sheet of a paper having a higher initial breakdown strength and a lower power factor, said dielectric being impregnated with a halogenated dielectric material.

10. An electric condenser containing a dielectric comprising at least one sheet of wood pulp paper and adjacent thereto at least one sheet of a paper having a higher initial breakdown strength and a lower power factor, said dielectric being impregnated with a halogenated dielectric material.

11. An electric condenser containing a dielectric comprising at least one sheet of wood pulp paper and adjacent thereto at least one sheet of linen paper, said dielectric being impregnated with a halogenated dielectric material.

12. A dielectric comprising fibres of a cellulosic material containing a large proportion of beta and gamma cellulose and also fibres having a higher initial breakdown strength, said fibres being impregnated with a halogenated dielectric material.

13. An electric condenser having a dielectric comprising fibres of a cellulosic material containing a large proportion of beta and gamma cellulose and also fibres having a higher initial breakdown strength, said fibres being impregnated with a halogenated dielectric material.

GIRARD T. KOHMAN.